United States Patent
McClure et al.

(10) Patent No.: US 6,179,529 B1
(45) Date of Patent: Jan. 30, 2001

(54) METHOD AND APPARATUS FOR DRILLING A BORE

(75) Inventors: Richard McClure, Chadds Ford; Robert McClure, Westchester, both of PA (US)

(73) Assignee: UFF Machine Company, Upland, PA (US)

( * ) Notice: Under 35 U.S.C. 154(b), the term of this patent shall be extended for 0 days.

(21) Appl. No.: 09/220,393

(22) Filed: Dec. 23, 1998

Related U.S. Application Data

(60) Provisional application No. 60/068,836, filed on Dec. 24, 1997.

(51) Int. Cl.$^7$ ............................................. B23B 47/02
(52) U.S. Cl. ........................ 408/62; 408/104; 82/131
(58) Field of Search ................................. 29/40, 53, 55; 408/1 R, 62, 66, 90, 104, 705; 82/1.11, 131, 171; 279/137

(56) References Cited

U.S. PATENT DOCUMENTS

| Re. 24,289 | | 3/1957 | Farnsworth . |
| 740,641 | * | 10/1903 | Glover ........................ 29/40 |
| 766,748 | | 8/1904 | Vauclain . |
| 787,893 | | 4/1905 | Christoph . |
| 800,559 | | 10/1905 | Edgerton . |
| 884,125 | * | 4/1908 | Brightman ................ 29/53 |
| 1,226,302 | * | 5/1917 | Brightman ................ 29/53 |
| 1,376,791 | | 5/1921 | Baker et al. . |
| 1,529,557 | | 3/1925 | Simon . |
| 1,543,236 | * | 6/1925 | Sears ........................... 408/90 |
| 1,902,754 | * | 3/1933 | Bechler ....................... 29/53 |
| 2,330,577 | | 10/1943 | Hampf . |
| 2,691,205 | * | 10/1954 | Bechler ....................... 29/40 |
| 2,709,931 | * | 6/1955 | Bunnell ....................... 29/40 |
| 3,371,560 | | 3/1968 | Kaser . |
| 3,674,375 | | 7/1972 | Reed et al. . |
| 4,740,116 | | 4/1988 | Wellach . |
| 4,896,663 | | 1/1990 | Vandewalls . |
| 4,899,458 | | 2/1990 | Minelli . |
| 5,036,735 | * | 8/1991 | Vakhidov et al. .............. 279/137 |
| 5,053,037 | | 10/1991 | Lackey . |
| 5,108,396 | | 4/1992 | Lackey et al. . |
| 5,133,766 | | 7/1992 | Halpern . |
| 5,275,603 | | 1/1994 | Ferrante et al. . |
| 5,312,408 | | 5/1994 | Brown . |
| 5,433,720 | | 7/1995 | Faccioli et al. . |
| 5,569,262 | | 10/1996 | Carney . |
| 5,577,844 | | 11/1996 | Stancescu . |

* cited by examiner

Primary Examiner—Daniel W. Howell
(74) Attorney, Agent, or Firm—Needle & Rosenberg, P.C.

(57) ABSTRACT

Apparatus and method for boring a passage in a component having opposed ends and a longitudinal axis extending therebetween using a drill bit. A first motor turns the drill bit in a first direction about its axis of rotation, in which the axis of rotation is oriented substantially co-linear with the longitudinal axis of the component, and a second motor rotates the component about its longitudinal axis in a second direction, which is opposite to the first direction. The turning drill bit is moved longitudinally relative to the rotating component so that the relative movement therebetween causes the drill bit to bore the passage through a portion of the component substantially along its longitudinal axis.

17 Claims, 2 Drawing Sheets

METHOD AND APPARATUS FOR DRILLING A BORE

The present patent application claims priority to U.S. Provisional Patent Application Ser. No. 60/068,836, also entitled "Method and Apparatus for Drilling a Bore," filed on Dec. 24, 1997, which is incorporated herein by reference.

BACKGROUND OF THE INVENTION

1. Field of the Invention

The present invention relates to a centering and drilling method and machine, in which the drill bit and the component to be bored rotate in opposite directions. The present invention allows an exact concentric passage to be drilled that has greater accuracy than prior art techniques.

2. Background Art

With prior art devices, the drilled bore is not perfectly concentric, particularly for longer components. A minute offset or angle existing between the centerline of the drill and the centerline of the component at the starting position will result in the center of the passage not being co-linear with the centerline of the component along the length thereof. Such variation or offset in the position of the passage is undesired, particularly in components requiring exacting tolerances.

Prior art methods traditionally encompass a system in which the component is stationarily positioned and the drill bit rotates. The rotating drill bit is then moved toward and longitudinally through the component to bore a passage therein. Since minute offsets between the axis of the drill bit and the longitudinal axis of the component cause the passage to be non-concentric, many attempts have been made in the prior art to overcome this problem. One approach is using guides for the drill or component, which is disclosed for example in U.S. Pat. Nos. 3,371,560 to Käser, 4,470,116 to Wellach, and 1,376,791 to Baker et al. Furthermore, U.S. Pat. Nos. 3,674,375, 2,330,577, 800,599, 1,529,557, 787, 893, and 766,748 relate generally to work holders and centering devices.

U.S. Pat. No. Re 24,289 to Farnsworth discloses a different drilling device, in which the component is rotated about its longitudinal axis and the drill bit is stationary. However, these disclosed prior art techniques fail to bore a perfectly concentric passage in the component consistently, particularly for longer components. A problem is that the operator's ability to align exactly the axis of the drill bit with the longitudinal axis of the component is limited.

Therefore, a need exists in the art for a system that consistently allows concentric passages to be bored through a component. The system should be self-correcting so that a very slight misalignment by the operator is continually corrected as the system bores the passage. It is also desired that the system be inexpensive and easy to use.

SUMMARY OF THE INVENTION

The present invention, which comprises an apparatus and method for drilling an exactly concentric passage through a component, satisfies the above-discussed needs in the art. The component is rotated about its longitudinal axis, which is disposed along a centerline of the apparatus. In conjunction, the drill bit turns (or rotates) about its axis of rotation, which is also oriented along and co-linearly with the centerline of the apparatus. The drill bit, however, turns in the opposite direction as the component is rotated. The turning drill bit and rotating component are moved longitudinally toward each other so that the drill bit bores through component substantially along its longitudinal axis to form a passage therein.

The counter-rotational motion between the drill bit and the component moves the drill bit or component toward the centerline of the apparatus on every rotation as a result of centripetal force. That is, the opposed rotation of the drill bit and component acts to position the drill bit at the longitudinal axis of the component, thereby self-centering the drill bit.

Other aspects of the present invention include a variable speed motor controller that maintains constant torque between the component and the drill bit for optimum surface footage control. In addition, gundrill alignment bushings rotate with the component, which maintains an oil seal between the component and the drill bushing, further improving concentricity of the passage.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

Figure 1:
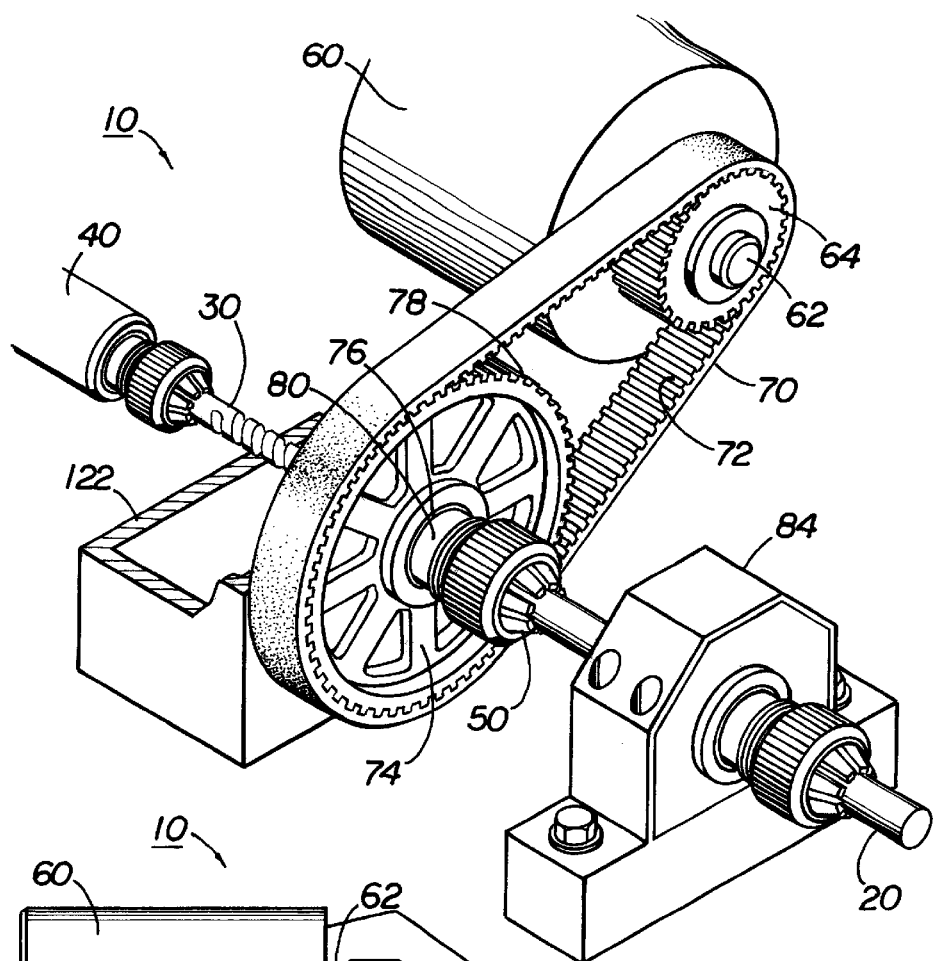
FIG. 1 is a front perspective view of the one embodiment of the present invention.
Figure 2:
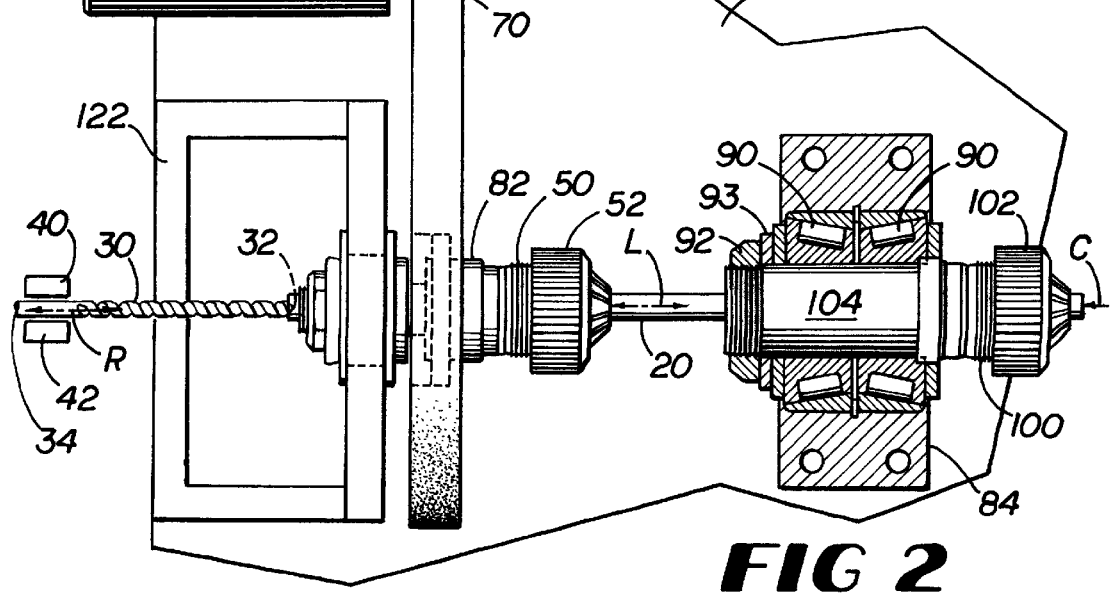
FIG. 2 is a top plan view, partially in schematic, of FIG. 1.
Figure 3:
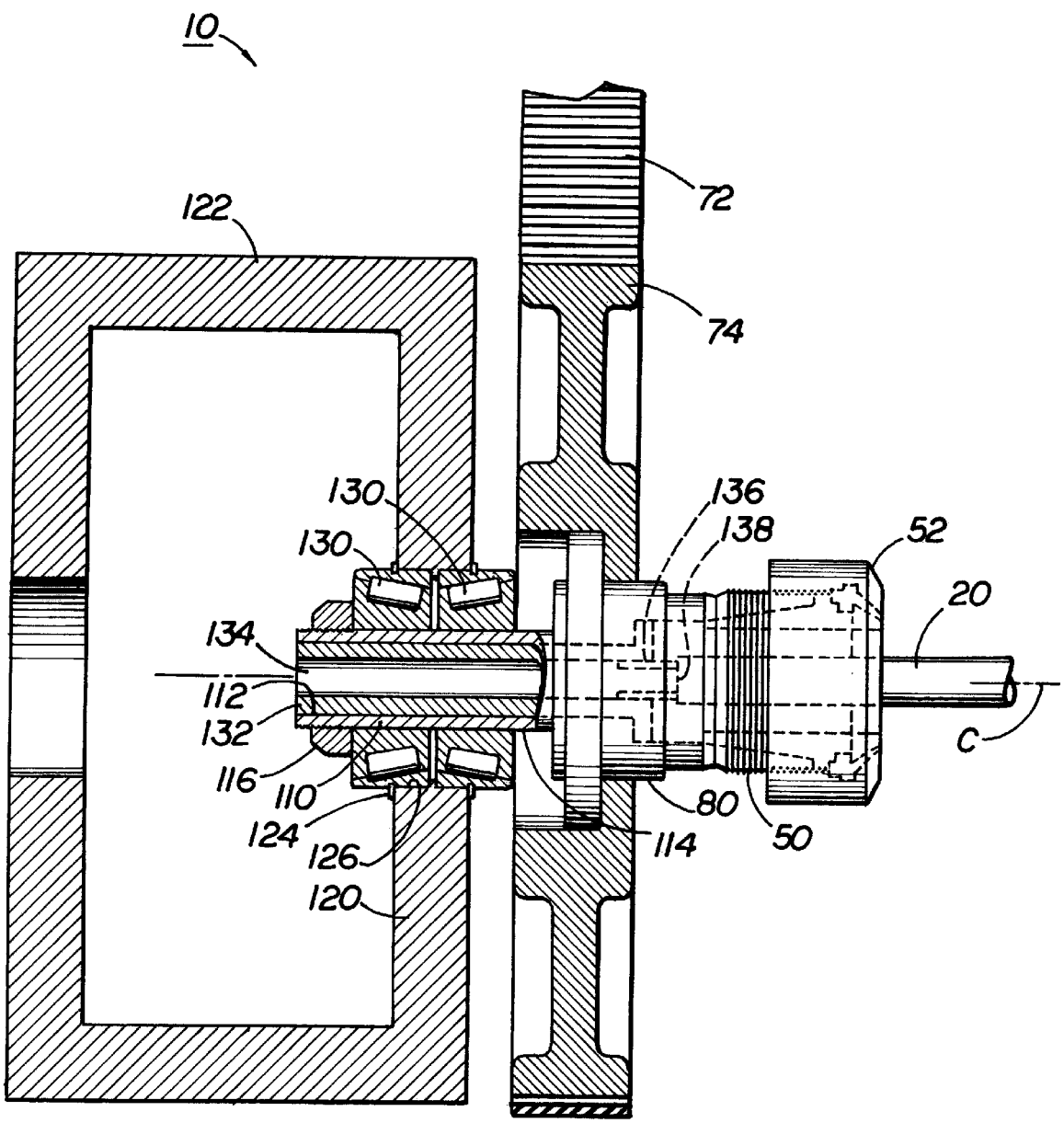
FIG. 3 is an enlarged top cross-sectional view of the aligning means shown in FIG. 1.

Referring generally to FIGS. 1–3, the present invention comprises a method and apparatus for boring a passage in and through an elongated component 20, such as a femur nail, along its longitudinal axis L. The component 20, which is also called the part, is usually circular in cross-section so that the bored passage is concentric with the circular outside surface of the component 20.

The apparatus 10 of the present invention comprises a drill bit 30 that turns in a first direction and a means for rotating the component 20 in a second direction, which is opposite the first direction. As shown in FIG. 2, the drill bit 30 has an axis of rotation R oriented co-linear with the longitudinal axis L of the component 20. The apparatus 10 also has a centerline C, in which the longitudinal axis L of the component 20, the axis of rotation R of the drill bit 30, and the centerline C of the apparatus 10 are all aligned substantially co-linear with each other.

The drill bit 30 is formed of an appropriate material, such as hardened steel or the like, to be able to drill the passage through the component 20 without deforming or failing. Still referring to FIG. 2, the drill bit 30 has an engaging end 32, an opposed connecting end 34, and an axis of rotation R that is disposed along the drill bit 30 and through the cross-sectional center of the two ends. The engaging end 32 of the drill bit 30 has a pointed tip that contacts and bores through the component 20.

The turning means 40 turns, or rotates, the drill bit 30 about its axis of rotation R in the first direction, e.g., clockwise or counter-clockwise. The turning means 40 can be an electric motor or other means known in the art for rotating a drill bit 30 to bore the passage.

The present invention also comprises a moving means for creating relative longitudinal movement between the drill bit 30 and the component 20. The moving means 42 causes the rotating component 20 to be moved longitudinally toward the turning drill bit 30, the drill bit 30 to be moved longitudinally toward the component 20, or both the drill bit 30 and the component 20 to be simultaneously moved longitudinally toward each other. In the embodiment shown in FIG. 2, the moving means 42 comprises the drill bit 30 being moved toward the component 20, which rotates at a longitudinally stationary position. The moving means 42 can comprise a movable slide-handle (not shown) connected to the drill bit 30 by gears or belts (not shown), in which movement of the slide-handle moves the drill bit 30, a slide (not shown) along which the operator may move the drill bit 30, and the like. The relative movement between the drill bit 30 and the component 20 initially causes the engaging end 32 of the drill bit 30 to contact one end of the component 20. Further movement of the drill bit 30 toward and into the component 20 bores the concentric passage through the component 20 along its longitudinal axis L.

The rotating means rotates the component 20 about its longitudinal axis L in the second direction, which is opposite to the first direction that the drill bit 30 turns. In the embodiment shown in FIGS. 1 and 2, the rotating means also comprises a means for detachably holding a portion of the component 20, a motor 60 that generates a rotational output, and a means for coupling the rotational output of the motor 60 to the holding means to translate rotational movement to turn the component 20.

The holding means preferably comprises a first collet 50. As is known in the art, the first collet 50 receives the surface of the component 20 therethrough. The nut 52 of the first collet 50 is tightened when the component 20 is at the desired position within the first collet 50, which causes the first collet 50 to grip or hold the outer surface of the component 20. The first collet 50 is balanced about its center so that a uniform centrifugal force is generated as the rotating means rotates the component 20 and attached collet 50.

Referring now to FIGS. 1 and 2, the rotational output of the motor 60 is translated through a shaft 62, which is connected to the motor 60 on one end and, preferably, to a timing gear 64 on its other end. The preferred motor 60 of the rotating means is a two horsepower electric motor that rotates its shaft at 0–1200 rotations per minute (rpm) with a constant torque. The motor 60 also preferably uses a reliance variable speed motor controller to maintain constant torque between the component 20 and the drill bit 30 for optimum surface footage control. As one skilled in the art appreciates, numerous variations of motors and controllers can be used, depending on factors such as the mass of the component 20 and materials of which the component 20 is formed. It is also contemplated using prime movers that use power sources other than electricity. Still another embodiment contemplates using a single motor as the prime mover for both the turning means and the rotating means, as opposed to using a first motor and a second motor to rotate the respective components.

The coupling means translates the rotational output of the shaft 62 to the first collet 50, which correspondingly rotates the component 20 to which the first collet 50 is detachably secured. In the preferred embodiment, the coupling means comprises a belt 70, a substantially circular wheel 74, and a drive shaft 80. The belt 70 has an interior surface 72 which engages the timing gear 64 on the end of the shaft 62. The wheel 74, which is also referred to as a timing wheel, has a center 76 and an outer surface 78. The outer surface 78 of the wheel 74 is adapted to complementarily engage the interior surface 72 of the belt 70, such as by a surface having two opposed protrusions on the sides of a flat portion onto which the interior surface 72 is received. The belt 70 is also connected to the timing gear 64 of the motor 60, which moves the belt 70 as the motor 60 generates a rotational output.

The drive shaft 80 has an external surface 82 securably connected to the center 76 of the wheel 74. A portion of the drive shaft 80 is also securably attached to the first collet 50. The moving belt 70 causes the wheel 74 to rotate, which rotates the drive shaft 80 connected to its center. The drive shaft 80, in turn, rotates the first collet 50 which correspondingly rotates the component 20 about its longitudinal axis L.

Other means for rotating the component 20 can be used. For example, the shaft 62 of the motor 60 can be aligned with and directly connected to one end of the component 20, in which the component 20 rotates at the same speed as the shaft 62. For the rotating means shown in FIGS. 1 and 2, the shaft 62 of the motor 60 and the component 20 can rotate at different speeds based on the gearing ratios.

The present invention also preferably further comprises a support means for preventing lateral movement of the component 20 as it rotates. Lateral movement is movement that occurs in any direction other than parallel to or along the longitudinal axis L of the component 20. Lateral movement, accordingly, does not encompass rotation of the component 20 about the longitudinal axis L or movement of the component 20 along the longitudinal axis L toward or away from the drill bit 30.

Still referring to FIGS. 1 and 2, the preferred supporting means comprises a pillow block 84 defining a ring therethrough. The ring has a snap ring groove into which a plurality of bushings 90 are received, as shown in FIG. 2. A second collet 100 is used that has a design similar to the first collet 50, in which the second collet 100 also detachably holds the component 20 so that rotation of the component 20 correspondingly causes the second collet 100 to rotate. A collet nut 102 connects a shaft 104 disposed through the pillow block 84 to the second collet 100 so that the second collet 100 also interconnects the pillow block 84 and the component 20 via the shaft 104. In addition, a locknut 92 and washer 93 are disposed on the opposed side of the shaft 104 from the second collet 100 to secure the shaft 104 to the pillow block 84. Bushings 90 support the external surface of the shaft 104. Since the pillow block 84 is stationarily positioned by being mounted to the frame 12, the pillow block 84 prevents the component 20 from moving both longitudinally and laterally relative to the longitudinal axis L of the component 20.

Referring now to FIGS. 2 and 3, the embodiment shown of the present invention further comprises a means for aligning the drill bit 30 relative to the component 20. The preferred aligning means comprises a spindle shaft 110 securably interconnected to a portion of the first collet 50 and/or the drive shaft 80, a stationarily positioned upstanding member 120, and a plurality of bushings 130. The spindle shaft 110 has an external surface 114 and defines a duct 112 therethrough of a size to receive the drill bit 30 therein. One end of the spindle shaft 110 is interconnected to the first collet 50 and/or drive shaft 80 so that the spindle shaft 110 rotates with the first collet 50.

The upstanding member 120 is preferably part of a chip box 122 that collects the shavings and chips generated as the drill bit 30 bores the passage through the component 20. The upstanding member 120 defines a slot 124 through which a portion of the spindle shaft 110 is disposed. The slot 124 has an edge 126.

The bushings 130 are disposed intermediate the edge 126 of the slot 124 and the external surface 114 of the spindle shaft 110 to laterally support the spindle shaft 110 as it rotates. The spindle shaft 110 is longitudinally held in position, similar to the design of the pillow block 84. More specifically, a portion of the spindle shaft 110 flares opposite the first collet 50 and engages a locknut 116, which is tightened to position the bushings 130. Thus, the bushings 130, positioned between the locknut 116 and the drive shaft 80 and positioned between the edge 126 of the slot 124 and the spindle shaft 110, longitudinally and laterally position and support the component 20 at its forward end.

As shown best in FIG. 3, the present invention further preferably comprises a holding bushing 132 disposed within a portion of the duct 112 of the spindle shaft 110, in which the holding bushing 132 defines a chamber 134 extending therethrough, which is of a size to receive the drill bit 30 therein. The present invention also preferably comprises a gundrill alignment bushing 136 disposed within the chamber 134 of the holding bushing 132 for supporting and positioning the drill bit 30. The gundrill alignment bushing 136 has a first end 138 adapted to be disposed adjacent an end of the component 20. The gundrill alignment bushing 136 rotates with the component 20, which maintains an oil seal between the component 20 and the drill bushing, further improving concentricity of the passage.

The method of the present invention comprises turning the drill bit 30 in a first direction about its axis of rotation R. The method concurrently comprises the step of rotating the component 20 about its longitudinal axis L in a second direction, which is opposite to the first direction. As the drill bit 30 and the component 20 rotate in opposite directions, the method of the present invention then entails creating relative longitudinal movement between the drill bit 30 and the component 20 so that the drill bit 30 bores a passage through a portion of the component 20 substantially along its longitudinal axis L. It is believed that the opposed rotation of the component 20 and drill bit 30 acts as a centripetal force on the drill bit 30, which continuously directs the drill bit 30 to bore along the longitudinal axis L of the component 20.

It is contemplated that the present invention can bore a passage through components that are non-circular in cross-section. However, as one skilled in the art will appreciate, the cross-sectional shape should preferably be symmetrical about its longitudinal axis L so that an evenly applied centrifugal force exists relative to the longitudinal axis L of the component 20 as it rotates. Asymmetrical shapes may not create the same self-centering effect as symmetrical cross-sections, such as a circular cross-section.

Although the present invention has been described with reference to specific details of certain embodiments thereof, it is not intended that such details should be regarded as limitations upon the scope of the invention except as and to the extent that they are included in the accompanying claims.

What is claimed is:

1. An apparatus for boring a component having opposed ends and a longitudinal axis extending therebetween, comprising:
   a. a drill bit having an axis of rotation which is oriented substantially co-linear with the longitudinal axis of the component;
   b. means for turning the drill bit about its axis of rotation in a first direction;
   c. means for rotating the component about its longitudinal axis in a second direction which is opposite to the first direction;
   d. moving means for creating relative longitudinal movement between the drill bit and the component so that the relative movement therebetween causes the drill bit to bore a passage through a portion of the component substantially along its longitudinal axis; and
   e. means for detachably gripping a portion of the component which is disposed adjacent the rotating means, wherein rotation of the component causes the gripping means to rotate; and
   f. means for positioning the gripping means to prevent lateral movement thereof, wherein the positioning means comprises:
      i. a spindle shaft securably attached to a portion of the gripping means, the spindle shaft having an external surface and defining a duct therethrough of a size to receive the drill bit therein;
      ii. a stationarily positioned upstanding member defining a slot through which a portion of the spindle shaft is disposed, the slot having an edge; and
      iii. a plurality of bushings disposed intermediate the edge of the slot and the external surface of the spindle shaft.

2. The apparatus of claim 1, wherein the rotating means comprises:
   a. means for detachably holding a portion of the component;
   b. a motor that generates a rotational output;
   c. means for powering the motor; and
   d. means for coupling the rotational output of the motor to the holding means so that rotation of the holding means rotates the component held thereby.

3. The apparatus of claim 2, wherein the coupling means comprises:
   a. a belt having an interior surface which engages a portion of the motor that rotates from the rotational output generated by the motor;
   b. a substantially circular wheel having a center and an outer surface circumscribing the center, the outer surface adapted to complementarily engage the interior surface of the belt; and
   c. a drive shaft having an external surface securably attached to the center of the wheel, wherein a portion of the drive shaft is securably attached to the holding means, wherein rotational output of the motor moves the belt, which rotates the wheel, which rotates the drive shaft, which rotates the holding means, which rotates the component about its longitudinal axis.

4. The apparatus of claim 3, wherein the holding means comprises a first collet.

5. The apparatus of claim 3, further comprising supporting means for preventing lateral movement of the component.

6. The apparatus of claim 5, wherein the supporting means comprises
   a. a pillow block defining a ring therethrough; and
   b. a plurality of bushings disposed within the ring that supportingly contact the external surface of the drive shaft.

7. An apparatus, comprising:
 a. a drill bit having an axis of rotation;
 b. a first motor for turning the drill bit about its axis of rotation in a first direction;
 c. a component having a first end located adjacent the drill bit, an opposed second end, and a longitudinal axis extending therebetween, the longitudinal axis oriented substantially co-linear with the axis of rotation of the drill bit;
 d. a second motor for rotating the component about its longitudinal axis in a second direction opposite the first direction;
 e. a slide for moving a selected one of the drill bit or the component for creating relative longitudinal movement between the drill bit and the component so that the relative movement therebetween causes the drill bit to bore a passage through a portion of the component substantially along its longitudinal axis;
 f. a spindle shaft disposed adjacent to the first end of the component which is adjacent the drill bit, the spindle shaft having an external surface and defining a duct therethrough of a size to receive the drill bit therein; and
 g. a plurality of bushings stationarily positioned relative to the spindle shaft, each bushing contacting and supporting the external surface of the spindle shaft.

8. The apparatus of claim 7, further comprising:
 a. a holding bushing disposed within a portion of the duct of the spindle shaft, the holding bushing defining a chamber extending therethrough; and
 b. a gundrill alignment bushing disposed within the chamber of the holding bushing for supporting and positioning the drill bit and having a first end adapted to be disposed adjacent a portion of the component.

9. The apparatus of claim 1, further comprising:
 a. a holding bushing disposed within a portion of the duct of the spindle shaft, the holding bushing defining a chamber extending therethrough; and
 b. a gundrill alignment bushing disposed within the chamber of the holding bushing for supporting and positioning the drill bit and having a first end adapted to be disposed adjacent a portion of the component.

10. The apparatus of claim 1, wherein the gripping means comprises a second collet.

11. An apparatus for boring a component having opposed ends and a longitudinal axis extending therebetween, comprising:
 a. a drill bit having an axis of rotation which is oriented substantially co-linear with the longitudinal axis of the component;
 b. a first motor operably connected to the drill bit for turning the drill bit about its axis of rotation in a first direction;
 c. a second motor operably connected to the component for rotating the component about its longitudinal axis in a second direction which is opposite to the first direction; and
 d. a slide for moving a selected one of the drill bit or the component for creating relative longitudinal movement between the drill bit and the component so that the relative movement therebetween causes the drill bit to bore a passage through a portion of the component substantially along its longitudinal axis;
 e. a collet disposed over a surface portion of the component wherein rotation of the component by the second motor causes the collet to rotate;
 f. a spindle shaft securably attached to a portion of the collet, the spindle shaft having an external surface and defining a duct therethrough of a size to receive the drill bit therein;
 g. a stationarily positioned support defining a slot through which a portion of the spindle shaft is disposed, the slot having an edge; and
 h. a plurality of bushings disposed intermediate the edge of the slot and the external surface of the spindle shaft.

12. The apparatus of claim 7, wherein a single motor functions as both the first motor and the second motor.

13. The apparatus of claim 11, wherein a single motor functions as both the first motor and the second motor.

14. The apparatus of claim 11, further comprising:
 a. a holding bushing disposed within a portion of the duct of the spindle shaft, the holding bushing defining a chamber extending therethrough; and
 b. a gundrill alignment bushing disposed within the chamber of the holding bushing for supporting and positioning the drill bit and having a first end adapted to be disposed adjacent a portion of the component.

15. An apparatus, comprising:
 a. a drill bit having an axis of rotation;
 b. a first motor for turning the drill bit about its axis of rotation in a first direction;
 c. a second motor operably connected to a component which has a longitudinal axis oriented substantially co-linear with the axis of rotation of the drill bit, the second motor rotating the component about its longitudinal axis in a second direction opposite the first direction;
 d. a slide for moving a selected one of the drill bit or the component for creating relative longitudinal movement between the drill bit and the component so that the relative movement therebetween causes the drill bit to bore a passage through a portion of the component substantially along its longitudinal axis;
 e. a spindle shaft disposed adjacent to an end of the component adjacent the drill bit, the spindle shaft having an external surface and defining a duct therethrough of a size to receive the drill bit therein; and
 f. a plurality of bushings stationarily positioned relative to the spindle shaft, each bushing contacting and supporting the external surface of the spindle shaft.

16. The apparatus of claim 15, wherein a single motor functions as both the first motor and the second motor.

17. The apparatus of claim 15, further comprising:
 a. a holding bushing disposed within a portion of the duct of the spindle shaft, the holding bushing defining a chamber extending therethrough; and
 b. a gundrill alignment bushing disposed within the chamber of the holding bushing for supporting and positioning the drill bit and having a first end adapted to be disposed adjacent a portion of the component.

* * * * *